F. E. Nearing's Horse Rake & Tedder
73192
PATENTED
JAN 7 1868
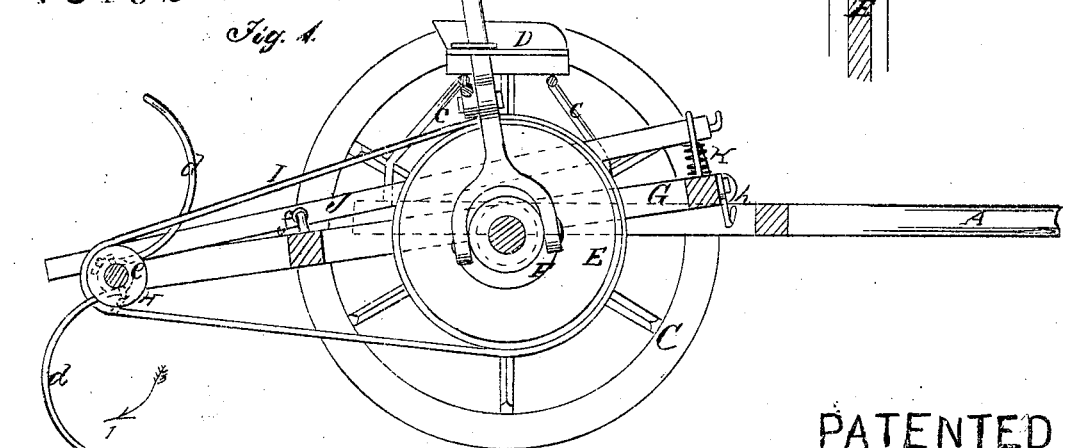
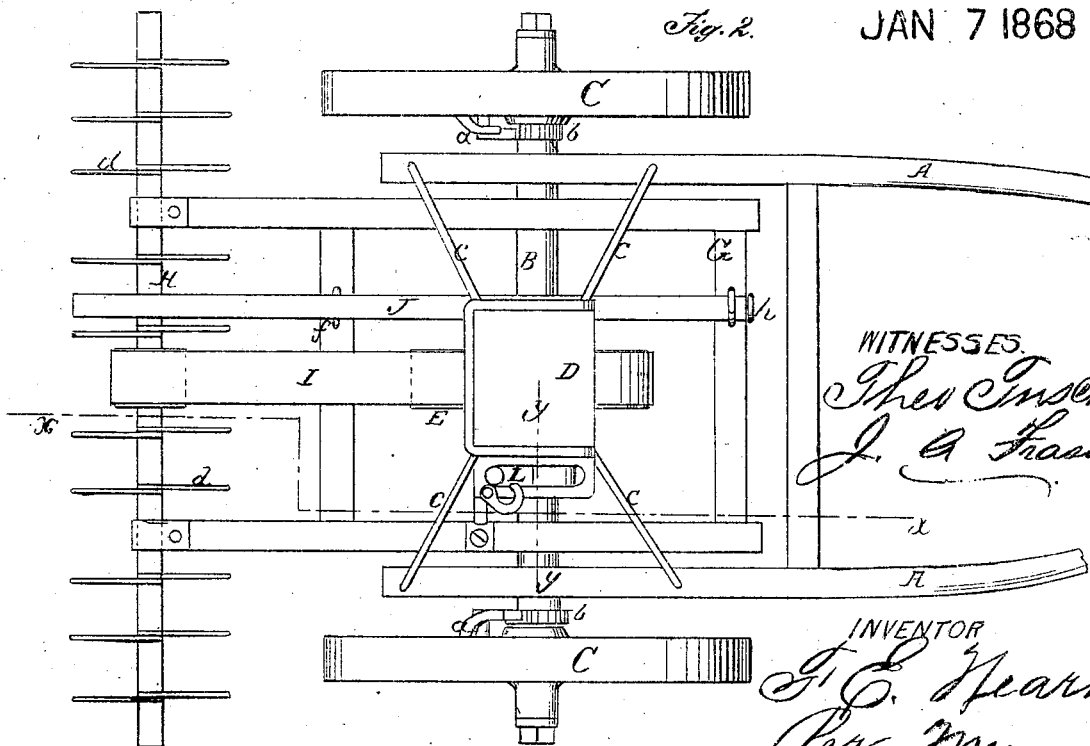
WITNESSES.
Theo Tuschs
J. G. Fraser
INVENTOR
F. E. Nearing
per Munn
Attorneys

UNITED STATES PATENT OFFICE.

FREDERICK E. NEARING, OF BROOKFIELD, CONNECTICUT.

IMPROVEMENT IN COMBINED HORSE-RAKE AND HAY-SPREADER.

Specification forming part of Letters Patent No. 73,192, dated January 14, 1868.

*To all whom it may concern:*

Be it known that I, FREDERICK E. NEARING, of Brookfield, in the county of Fairfield, and State of Connecticut, have invented a new and Improved Combined Horse-Rake and Tedder; and I do hereby declare that the following is a full, clear, and exact description thereof, which will enable those skilled in the art to make and use the same, reference being had to the accompanying drawings, forming part of this specification.

This invention relates to a new and improved combination of a horse-rake and tedder; and it consists of a peculiar construction and arrangement of parts, as hereinafter fully shown and described, whereby the device may, by a very simple manipulation, be readily converted from a rake into a tedder, and vice versa, and rendered capable of operating in either capacity, equally as well as if made specially for either purpose.

In the accompanying sheet of drawings, Figure 1 is a side sectional view of my invention, taken in the line $x\,x$, Fig. 2; Fig. 2, a plan or top view of the same; Fig. 3, a section of a portion of the same, taken in the line $y\,y$, Fig. 2.

Similar letters of reference indicate corresponding parts.

A A represent thills, the rear parts of which are secured to an axle, B, having a wheel, C, on each end of it, the axle being allowed to turn freely in boxes or bearings at the under side of the thills.

The wheels C C are fitted loosely on the axle B, but are connected to it, when the device is drawn forward, by means of pawls $a$ on the wheels, engaging with ratchets $b$ on the axle, the pawls slipping over the ratchets when the device is "backed."

The driver's seat D is supported by rods $c$, from the thills A A, and on the axle B there is fitted loosely a pulley, E, which may be connected therewith, when desired, by a clutch, F.

G is a rectangular frame, which is fitted loosely on the axle B, so as to work freely thereon. This frame projects considerably to the rear of the axle B, and has an ordinary revolving rake, H, fitted to its rear end. This rake may be provided with wire teeth, $d$, curved in the usual way, and said rake, when used to tedder or scatter hay, is rotated continually from the axle B, by means of a belt, I, the latter passing around a pulley, $e$, on the rake-head, and around the pulley E on the axle, the pulley being connected with the axle by means of the clutch F.

When the rake H is thus rotated, it turns in the direction indicated by arrow 1, the convex sides of the teeth $d$ acting upon the hay, so that the latter will not be carried around with the rake, but be thrown upward and outward behind it.

When the device is used as a horse-rake, the pulley E is disconnected from the axle B, the clutch F being thrown out from the pulley, and the rake H, consequently, will not be rotated under the draught-movement of the machine.

The rake is, in this adaptation of the device, prevented from rotating casually, by means of a lever-bar, J, balanced on the frame G, and resting on a fulcrum, $f$, the rear part of said bar having a notch made in it for spurs $g\,g$, on the rake-head, to alternately catch against.

Under the front end of the lever-bar J there is a spiral spring, K, which has a tendency to keep the rear end down upon the rake-head.

When the device is used as a tedder, the rear end of the lever-bar is kept above and free from the rake-head, by having the front end of the former depressed or forced down, and kept in that position by a hook, $h$; and when the device is to be used for raking, the hook $h$ is disengaged from the front end of the lever-bar, and the spring K forces up said end and forces down the rear end upon the rake-head.

When the lower teeth of the rake have gathered up a load, the driver, with his foot, presses down the front end of the lever-bar J, thereby raising the rear end of the latter, and freeing the rake-head, so that the rake may make a half revolution and discharge its load, the upper teeth $d$, when turned down to working portion, being stopped and retained by the spur $g$, which was previously at the under side of the rake-head, catching against the notch of the lever-bar J.

The clutch F is shifted by a lever, L, which extends up at one side of the driver's seat D.

I claim as new and desire to secure by Letters Patent—

The frame G, fitted loosely on the axle B, and carrying the revolving rake H, in combination with the loose pulley E and clutch F on the axle B, and the lever-bar J on frame G, with the spurs $g$ $g$ on the rake-head, all being arranged to operate in the manner substantially as and for the purpose set forth.

FREDERICK E. NEARING.

Witnesses:
    EDWIN H. NEARING,
    ROBT. G. KNAPP.